April 14, 1936.  W. NANFELDT  2,037,687
MOLDABLE COMPOSITION AND PROCESS FOR MAKING THE SAME
Original Filed Feb. 2, 1931
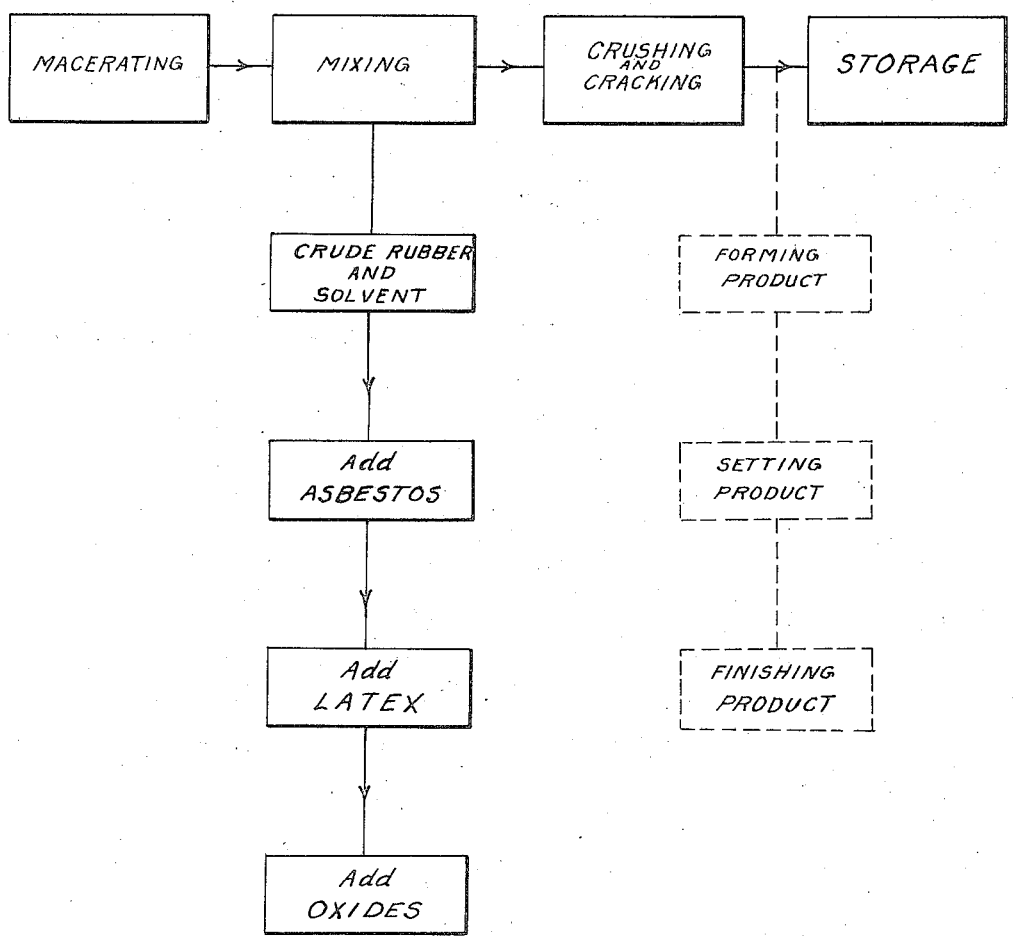
INVENTOR
William Nanfeldt
BY Chester H Braselton
ATTORNEY Patented Apr. 14, 1936

2,037,687

UNITED STATES PATENT OFFICE 2,037,687

MOLDABLE COMPOSITION AND PROCESS FOR MAKING THE SAME

William Nanfeldt, Clifton, N. J., assignor to World Bestos Corporation, Paterson, N. J., a corporation of Delaware Continuation of application Serial No. 512,891, February 2, 1931. This application May 18, 1934, Serial No. 727,447

19 Claims. (Cl. 106—23)

This invention relates to molded products and a process for making the same. More specifically, the invention comprises a method of mechanically combining rubber and an alkaline filler such as asbestos, the rubber being in part initially in the form of latex. The invention includes means for preventing coagulation of the latex in the treating of the materials.

This application is a continuation of my co-pending application Serial No. 512,891, filed February 2nd, 1931.

Moldable products containing rubber combined with a filler such as asbestos fibre are known and in common use. Various undesirable features, however, have existed in the processes utilized for making such products. For example, the time involved in mixing crude rubber with an appropriate solvent has been so long as to diminish the efficiency of the process. Another drawback of prior processes has been the practical inability to use latex without protective colloids instead of commercial "smoked" or "crude" rubber. This has been due to the fact that latex tends to coagulate when in the presence of asbestos with the result that the product is lumpy. A further difficulty in the manufacture of rubber-filler moldable products has arisen from the fact that in the drying operation of the material in the formation of the product the surface or skin dries much more rapidly than the interior, thus causing the formation of a hard surface layer and internal stresses within the product. This condition also lengthens the process considerably, thereby increasing the manufacturing cost.

One of the objects of the present invention is to provide a process for manufacturing rubber and alkaline filler moldable material or composition which utilizes a relatively high percentage of latex in the rubber content of the mixture.

Another object of the invention is to provide a moldable product which will dry with relative uniformity throughout its mass and at a relatively more rapid rate than has heretofore been possible. Still another object of the invention is to provide a process in which the crude rubber content is rapidly converted into cement solution, thus further reducing the time element of the process. An additional object is to provide a process which will diminish the amount of solvent necessary to prevent the batch of material from becoming too dry in the mixing steps. An object also is to permit the use of a substance which will add cohesiveness to the moldable material in the process of making the same.

Various other objects will appear on consideration of the following detailed description of the process and in connection with the accompanying drawing in which is indicated diagrammatically the relatively more important consecutive steps of the process.

Considering now the process in detail, the first step involves the macerating or breaking down of crude or smoked sheet rubber and simultaneous mixing with cure accelerators in a rubber roll mill or milling machine. This machine is of conventional type and consists of adjacent rotating steel drums having parallel shafts and drum surfaces, one of the drums being adjustable relative to the other so that the displacement between the drums may be varied. Appropriate gears rotate these drums in opposite directions so that when material is placed between the upper parts of the drums the material is fed down between the drums and is broken and macerated and mixed thereby, and if of sufficient adhesiveness attaches itself to the drum surface and is carried again into the original mass. This mixing and macerating operation is continued until the rubber is thoroughly disintegrated and the accelerator uniformly mixed through the mass.

The original batch placed in the hopper above the miller is smoked rubber together with sulphur and, preferably, materials tending to facilitate curing, such as litharge and magnesium oxide. These oxides accelerate the curing operation and are of such amounts that will bear the correct proportion to the completed batch. In operation it has been found, for example, that a satisfactory proportion of rubber, sulphur, litharge, and magnesium oxide, by weight of completed batch, is as follows:

| | Per cent |
|---|---|
| Crude rubber | 2 to 14 |
| Sulphur | 9 |
| Litharge | 6 |
| Magnesium oxide | 3.6 |

After the rubber has been broken down in the mill and the ingredients above mentioned evenly dispersed therethrough, the drums of the mill are adjusted to a displacement of less than thirty-thousandths of an inch and the batch then forced down through this narrow area until a thin sheet is formed on the drum of the approximate thickness of the displacement between the drums, that is, between four or five thousandths of an inch. This sheet is then cut off of the drum and a new sheet permitted to form. These sheets of thin rubber are then removed and placed in the mixer.

The mixer is of a well-known type of impact mixing or masticating apparatus commonly used for dough mixing and other technical uses. Essentially this mixer consists in a receptacle having a transverse partition in its base rising approximately one-half the height of the receptacle. Each side of the receptacle has its base curved and supports a rotating shaft having an eccentric enlarged member which rotates in such a position as to approach from above the dividing partition. Any material in the base will be carried around by the travelling eccentric member and moved over the partition and then forced around again as the eccentric member rotates.

Into a mixer of this type, or any other mixer that performs an equivalent function, the thin sheets of rubber containing the sulphur and oxides are put, together with a rubber solvent such as gasoline, benzol or naphtha, the weight of solvent added being substantially the same as that of the charge, and mixing is continued for about half an hour until the rubber is completely dissolved in the solvent, forming a thin cement. Because of the use of the thin sheet the time of this dissolving process is considerably reduced over the usual time of forming cement from smoked rubber. In the prior processes ordinarily smoked rubber slabs or sheets which have a thickness of one-fourth to one-half inch are soaked in gasoline or other solvent from four to six hours. Soaked rubber is then placed in the mixing or beating machine from eight to four hours, making a total averaging approximately twelve hours in distinction over the thin sheet method above described requiring approximately one-half an hour.

When the cement has been prepared the base filler is then added. This takes the form preferably of asbestos fibre, although other fillers may be used. The mixing operation is then continued for approximately one-half an hour or until the filler fibres or particles are individually smeared and coated with rubber. This is an important feature of the process inasmuch as the individual coating on the various fibres of asbestos, where used, tends to prevent in the latter steps of the process any chemical reaction of the alkaline asbestos upon the latex.

To the batch of asbestos and rubber and accelerator oxides is now added the rubber latex. The amount of latex is such that when added to the crude rubber originally included, the total rubber content will be approximately 18% by weight of the total final mass. Experiment has indicated that the relative amount of latex to the total amount of rubber may be varied within wide limits, percentages of rubber from 10% to 75% giving satisfactory results. The greater the amount of latex, the drier the material and the less sticky or viscous. As hereinabove stated, a difficulty heretofore found with latex when used in conjunction with asbestos has been its tendency towards coagulation. In the rubber coating process hereinabove described, latex is prevented from coming into contact with the asbestos and hence this coagulation of the latex is prevented.

Because of the use of latex, the amount of solvent necessary is greatly reduced over that required where crude rubber is used. The latex also acts as a bonding material which causes the stock to stick to itself and in each revolution of the mixing blades the material is pulled and shredded to such an extent that the mixing time is greatly reduced. The mixing operation is continued until the latex, which is of light color, disappears from view in the dark batch of rubber-asbestos mixture. At this time the final lot of ingredients is added, consisting of graphite, iron oxide, and kaolin, in the proportions approximately by weight of completed mixture of 6% graphite, 3% iron oxide and 9.1% kaolin. The mixing is then continued until fillers and oxides are thoroughly distributed throughout the mass, thus completing the mixing operation.

The batch is now transferred from the mixer to the rubber cracker mill. This mill is similar to the original macerating roll mill and consists in oppositely rotating drums, both of which may be smooth or one of which may be slightly corrugated to increase the relative pull on the material. A clearance of approximately one-thirty-second of an inch is maintained between the rolls and one may be rotated more rapidly than the other. The stock is now passed through this roller which causes a further shredding and combing out of the material, and also a crushing of small lumps and balls that may have formed in the mixing. This completes the manufacture of the stock material which may now be stored in vats or cans or which may be passed directly to various other apparatus for further treatment in the manufacture of various products.

A valuable use of this material is for brake lining. As diagrammatically indicated on the drawing, the process for making the brake lining may be continued as follows: The moldable composition is first formed to the approximate shape of the brake lining. This may be accomplished in an extruding machine by means of which the material is forced by hydraulic or other pressure through a constricted opening or nozzle formed to the approximate dimensions of the brake lining. The shaped preliminary lining is then dried to remove the solvent and compressed in the presence of heat to vulcanize the rubber and thus set the composition in its final shape. The succeeding treatment has to do with exact dimensioning of the lining and removing undue stiffness in the same.

Where the material is employed for products such as friction brake bands which necessitate molding and drying steps in the process of manufacture, the use of latex in the molded material is of further advantage in that the water content of latex is dispersed throughout the material, and in the drying operation, when heated, tends to make the material porous. This facilitates the drying operation and also prevents the formation of a stiff surface on the product, tending to make the product inflexible.

The elements or ingredients mentioned as forming a typical moldable composition are such as would be satisfactory for the use of a friction material such as brake lining. The proportionate parts by weight in the completed composition of the main substances used may be as follows:

|  | Per cent |
|---|---|
| Asbestos fibre | 30 to 60 |
| Rubber | 10 to 20 |
| Sulphur | 5 to 10 |

The balance of the composition elements may be of the following substances, the amount of each of which being variable within the limits mentioned:

| | Per cent |
|---|---|
| Magnesium oxide (MgO) | 1 to 6 |
| Graphite | 1 to 6 |
| Litharge | 1 to 10 |
| Iron oxide (Fe$_2$O$_3$) | 1 to 5 |
| Kaolin | 1 to 25 |

The invention, however, is not limited to the use of a moldable material for friction purposes. Depending upon the particular characteristics of the product desired, materials other than asbestos, such as granular mineral fillers and including zinc oxide, whiting, talc, etc., may be used. Also fibrous material, which is non-alkaline in reaction to which the process lends itself satisfactorily in the production of a suitable composition for molding, may also be employed. This latter class would include materials formed of organic fibre, such as cotton, wool, hemp, shredded leather, etc. Fundamentally, however, the invention has utility in the preparation of a moldable composition containing asbestos fibre.

The term "solvent" as applied in the specification and claims in connection with rubber is used in the generally accepted sense, although strictly speaking the materials mentioned such as gasoline, benzol or naphtha may not be a solvent for rubber.

The percentage of materials as well as the time of treatment may, of course, be varied to such an extent as to secure desired variations in the product. It is not desired, therefore, to limit the invention to the specific materials and process steps described other than such limitations are imposed by the claims hereto appended.

Having thus described my invention, what I desire to claim is:

1. The process of making a rubber-containing composition, which consists in mechanically macerating crude rubber, forming said rubber into thin sheets, mixing the sheet rubber successively with a volatile solvent, asbestos fibre, and rubber latex, and finally crushing the material.

2. The process of making a rubber-containing composition, which consists in mechanically macerating crude rubber, forming said rubber into thin sheets, and mixing said sheet rubber successively with a solvent, asbestos fibre, and rubber latex.

3. The process of making a rubber-containing composition, which consists in macerating crude rubber, and mixing said rubber successively with a solvent, asbestos fibre, and rubber latex.

4. A method of combining rubber with asbestos which consists in macerating crude rubber, forming the macerated rubber into thin sheets, mixing the sheeted rubber with a solvent to form a cement, mixing the cement with asbestos until the fibres of the asbestos are coated thereby, and mixing the cement coated asbestos with rubber latex.

5. A process of combining rubber with asbestos which consists in macerating crude rubber, forming said rubber into sheets having a thickness preferably less than one-thirty-second of an inch, mixing the sheeted rubber with a solvent to form a cement, mixing the cement with asbestos fibre to coat the fibre, and mixing the coated fibre with rubber latex.

6. The process of making a rubber-containing composition, which consists in mechanically macerating crude rubber by passing said rubber between rotating pressure rolls, mixing with said rubber, sulphur, litharge, and magnesium oxide (MgO), forming said mixture into sheets having a thickness of approximately .005 of an inch, mixing and agitating said sheets in a container containing a solvent such as gasoline in such amounts and for such a period of time as to bring about a solution of the rubber mixture in the solvent to form a cement, adding asbestos fibre of an amount equal to approximately 45% by weight of the final mixture, mixing said asbestos with the cement approximately one-half hour or until the asbestos fibres are individually coated by the cement, adding rubber latex to said mix in amounts varying from 1% to 75% of the normal amount of rubber by weight finally contained in the mixture, such normal amount being approximately 18%, mixing the latex with the coated asbestos fibre until the latex is thoroughly disseminated or for a time period of approximately one-third to one-half hour, adding to the latex mixture various lubricating and ageing oxides and fillers including graphite 6%, iron oxide (Fe$_2$O$_3$) 3%, kaolin 9%, each by weight of the completed mixture, continuing the mixing until a uniform homogeneous mass is secured, and finally discharging said mass between pressure rollers whereby balls and lumps of material are disintegrated and the mass made uniform and homogeneous.

7. The process of making a rubber-containing composition, which consists in macerating crude rubber, mixing said rubber with sulphur and cure accelerating agents, forming said mixture into thin sheets, mixing the sheeted rubber mixture successively with a solvent, with asbestos, with rubber latex, and with ageing and filling ingredients, and finally breaking down the mixture.

8. The process of making a rubber-containing composition which consists in breaking down crude rubber in the presence of magnesium oxide (MgO), litharge, and sulphur, forming said mixture into thin sheets, masticating said sheets in the presence of a solvent to form a cement, mixing the cement with asbestos fibres until the fibres are individually coated with the cement, mixing rubber latex with the cement-coated asbestos until the latex is thoroughly disseminated, mixing with said latex-asbestos-cement mixture, graphite, iron oxide (Fe$_2$O$_3$), and kaolin, and finally disrupting the particles of the mixture.

9. The process of making a moldable product containing rubber and asbestos which consists in macerating crude rubber in the presence of sulphur and accelerating agents such as the oxide of magnesium and litharge, forming said mixture into relatively thin sheets preferably less than ten-thousandths of an inch thickness, mixing the sheeted rubber with a solvent such as gasoline until a cement is formed, adding asbestos fibre to the cement and mixing the same until the asbestos fibres are coated with cement, mixing rubber latex with said cement-coated asbestos, and adding fillers to the mass.

10. A moldable composition containing rubber and asbestos which comprises in approximation by weight asbestos 45%, rubber latex 2 to 14%, crude rubber 16 to 4%, sulphur 9%, graphite 6%, litharge 6%, iron oxide 3%, kaolin 9%, and magnesium oxide 3½%.

11. A moldable composition containing crude rubber, latex, and asbestos, in which the individual fibres of asbestos are coated solely by crude rubber.

12. A moldable composition containing crude rubber, rubber latex, asbestos fibre, and sulphur, the asbestos fibre being coated by the rubber.

13. A moldable composition containing crude rubber, a rubber solvent, rubber latex, asbestos, sulphur, iron oxide, magnesium oxide, graphite and kaolin, the fibres of asbestos being coated only by crude rubber.

14. A moldable composition containing by weight the following ingredients: crude rubber 18% to 2½%, rubber latex 1% to 15%, sulphur 5% to 10%, asbestos 30% to 60%, graphite not exceeding 6%, litharge not exceeding 10%, iron oxide not exceeding 5%, magnesium oxide not exceeding 6%, and kaolin not exceeding 25%.

15. A moldable composition containing crude rubber, rubber latex, and an alkaline filler, the filler being coated only by said crude rubber.

16. A moldable composition containing by weight the following ingredients: crude rubber 18% to 2½%, rubber latex 1% to 15%, sulphur 5% to 10%, asbestos 30% to 60%, graphite not exceeding 6%, litharge not exceeding 10%, iron oxide not exceeding 5%, magnesium oxide not exceeding 6%, and kaolin not exceeding 25%, the total rubber content of the composition varying between 10% and 20%.

17. A process of combining rubber with an alkaline filler which consists in forming a rubber solution with sulphur, magnesium oxide, litharge, and a solvent, coating asbestos fibres with said solution and mixing said coated asbestos fibres with rubber latex, iron oxide, graphite, and kaolin.

18. A process of combining rubber with an alkaline filler, which consists in coating the filler particles with crude rubber cement and then coating the rubber coated particles with rubber latex.

19. A process of combining rubber with an alkaline filler, which consists in forming a rubber solution, and mixing the solution successively with the filler and with rubber latex.

WILLIAM NANFELDT.